United States Patent
Oi

(10) Patent No.: US 9,041,759 B2
(45) Date of Patent: May 26, 2015

(54) LASER SCANNING UNIT AND IMAGE FORMING APPARATUS INCLUDING THE SAME, WITH LASER LIGHT INTENSITY DETECTION, ADJUSTMENT, AND CONTROL

(71) Applicant: KYOCERA Document Solutions Inc., Osaka-shi, Osaka (JP)

(72) Inventor: Hironobu Oi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 13/967,132

(22) Filed: Aug. 14, 2013

(65) Prior Publication Data
US 2014/0063172 A1  Mar. 6, 2014

(30) Foreign Application Priority Data
Aug. 28, 2012 (JP) ................................. 2012-188109

(51) Int. Cl.
*B41J 2/435*  (2006.01)
*B41J 2/47*  (2006.01)
*G02B 26/12*  (2006.01)

(52) U.S. Cl.
CPC ................................ *G02B 26/122* (2013.01)

(58) Field of Classification Search
USPC .................. 347/229–237, 246–250
See application file for complete search history.

(56) References Cited

U.S. PATENT DOCUMENTS

| | | | | |
|---|---|---|---|---|
| 6,671,299 | B2 * | 12/2003 | Suda | 372/38.01 |
| 7,995,088 | B2 * | 8/2011 | Iwai | 347/260 |
| 8,736,651 | B2 * | 5/2014 | Nakahata | 347/236 |
| 2013/0258032 | A1 * | 10/2013 | Ogasawara | 347/224 |

FOREIGN PATENT DOCUMENTS

| | | |
|---|---|---|
| JP | 2001260417 A | 9/2001 |
| JP | 2007203543 A | 8/2007 |

\* cited by examiner

*Primary Examiner* — Hai C Pham
(74) *Attorney, Agent, or Firm* — Alleman Hall McCoy Russell & Tuttle LLP

(57) ABSTRACT

A laser scanning unit includes a laser light source, rotating polygon mirror, drive motor, and entry detection, intensity detection, intensity adjustment, and drive control portions. The laser light source radiates first and second laser lights in first second directions, respectively. The drive motor rotates the polygon mirror reflecting the first laser light. The intensity adjustment portion adjusts the first laser light in accordance with the second laser light detected by the intensity detection portion, until a second time after a first time has elapsed since the first laser light entry detection by the entry detection portion. The drive control portion, upon adjustment by the intensity adjustment portion, drives the drive motor at a first rotation speed, wherein a return light entry timing is included within the first time or from when the second time has elapsed to the timing of the entry detection portion detection.

10 Claims, 4 Drawing Sheets

LASER SCANNING UNIT AND IMAGE FORMING APPARATUS INCLUDING THE SAME, WITH LASER LIGHT INTENSITY DETECTION, ADJUSTMENT, AND CONTROL

INCORPORATION BY REFERENCE

This application is based upon and claims the benefit of priority from the corresponding Japanese Patent Application No. 2012-188109 filed on Aug. 28, 2012, the entire contents of which are incorporated herein by reference.

BACKGROUND

The present disclosure relates to a laser scanning unit that performs scanning with laser light radiated from a laser light source, and an image forming apparatus including the laser scanning unit.

Generally, in an image forming apparatus of electronic photograph type, laser light is radiated from a laser light source based on image data. The laser light is deflected by a polygon mirror (rotating polygon mirror), to scan the surface of a photosensitive drum. Thus, an electrostatic latent image is formed on the photosensitive drum. Here, in order to keep constant the density of a toner image obtained by developing the electrostatic latent image formed on the photosensitive drum, it is necessary to keep constant the intensity of the laser light from the laser light source.

Accordingly, the image forming apparatus may execute Automatic Power Control (APC) processing of detecting the intensity of the laser light radiated from the laser light source, and adjusting the intensity of the laser light radiated from the laser light source based on the detected intensity. However, if return light reflected from the polygon mirror enters a detector that detects the laser light radiated from the laser light source, the accuracy of the APC processing is reduced.

In order to prevent the influence of the return light, the image forming apparatus may include: a light dividing portion that divides the laser light radiated from the laser light source; and an optical detecting portion that detects the light amount of only one of the divided laser lights.

SUMMARY

A laser scanning unit according to one aspect of the present disclosure includes: a laser light source, a rotating polygon mirror, a drive motor, an entry detection portion, an intensity detection portion, an intensity adjustment portion, and a drive control portion. The laser light source radiates first laser light and second laser light respectively in a first direction and a second direction which are opposite to each other. The rotating polygon mirror reflects the first laser light radiated from the laser light source. The drive motor rotates the rotating polygon mirror. The entry detection portion detects entry of the first laser light at a predetermined position on a scanning path of the first laser light reflected by the rotating polygon mirror. The intensity detection portion is provided on the second direction side of the laser light source and detects the intensity of the second laser light radiated from the laser light source. The intensity adjustment portion adjusts the intensity of the first laser light radiated from the laser light source, in accordance with a result of the detection by the intensity detection portion, during a predetermined second time after a predetermined first time has elapsed since the detection by the entry detection portion. The drive control portion, upon the adjustment by the intensity adjustment portion, drives the drive motor at a first rotation speed set in advance such that a return light entry timing when the first laser light reflected by the rotating polygon mirror enters the intensity detection portion is included within either the first time or a period from when the second time has elapsed to the timing of the detection by the entry detection portion.

An image forming apparatus according to another aspect of the present disclosure includes one or a plurality of laser scanning units. The laser scanning unit includes: a laser light source, a rotating polygon mirror, a drive motor, an entry detection portion, an intensity detection portion, an intensity adjustment portion, and a drive control portion. The laser light source radiates first laser light and second laser light respectively in a first direction and a second direction which are opposite to each other. The rotating polygon mirror reflects the first laser light radiated from the laser light source. The drive motor rotates the rotating polygon mirror. The entry detection portion detects entry of the first laser light at a predetermined position on a scanning path of the first laser light reflected by the rotating polygon mirror. The intensity detection portion is provided on the second direction side of the laser light source and detects the intensity of the second laser light radiated from the laser light source. The intensity adjustment portion adjusts the intensity of the first laser light radiated from the laser light source, in accordance with a result of the detection by the intensity detection portion, during a predetermined second time after a predetermined first time has elapsed since the detection by the entry detection portion. The drive control portion, upon the adjustment by the intensity adjustment portion, drives the drive motor at a first rotation speed set in advance such that a return light entry timing when the first laser light reflected by the rotating polygon mirror enters the intensity detection portion is included within either the first time or a period from when the second time has elapsed to the timing of the detection by the entry detection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments will be described with reference to the accompanying drawings. Here, the case of an image forming apparatus of monochrome type that includes one Laser Scanning Unit (LSU) 33 described later will be described. However, an image forming apparatus of color type that includes a plurality of the LSUs 33 may be used.

Figure 1A:
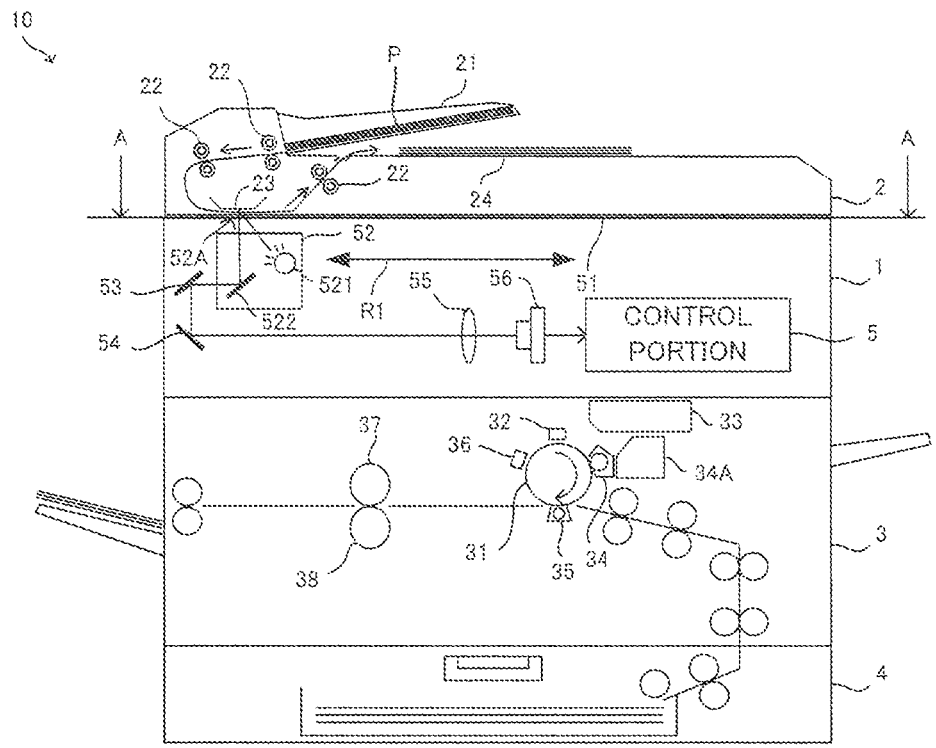
FIG. 1A is a schematic configuration diagram of a multifunction peripheral according to an embodiment of the present disclosure.
Figure 1B:
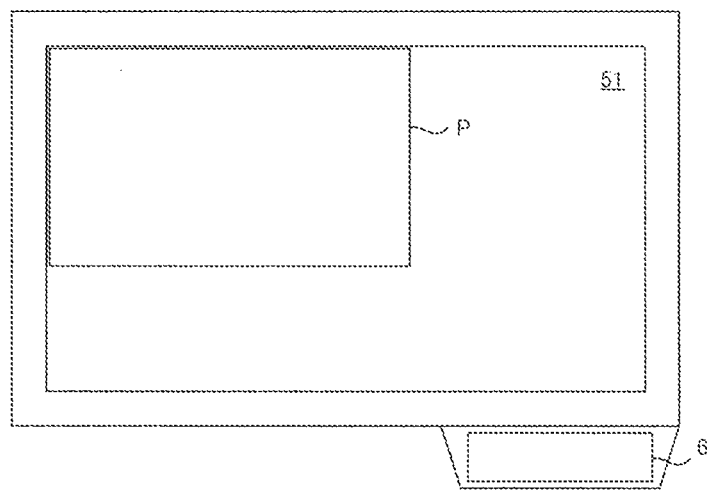
FIG. 1B is a view as seen from the direction of arrows A in FIG. 1A.

First, with reference to FIGS. 1A and 1B, the schematic configuration of a multifunction peripheral 10 according to an embodiment of the present disclosure will be described. It is noted that FIG. 1A is a schematic sectional view of the multifunction peripheral 10 and FIG. 1B is a view as seen from the direction of arrows A in FIG. 1A.

The multifunction peripheral 10 is an image forming apparatus including an image reading portion 1, an Automatic Document Feeder (ADF) 2, an image forming portion 3, sheet feed cassette 4, a control portion 5, an operation display portion 6, and the like. The operation display portion 6 is a touch panel or the like that displays various kinds of information in accordance with a control instruction from the control portion 5 and allows input of the various kinds of information to the control portion 5. It is noted that the multifunction peripheral 10 is merely an example of an image forming apparatus according to the present disclosure. For example, a printer, a facsimile device, a copy machine, and the like also correspond to an image forming apparatus according to the present disclosure.

The image reading portion 1 is an image reading portion including a contact glass 51, a reading unit 52, mirrors 53 and 54, an optical lens 55, a Charge Coupled Device (CCD) 56, and the like. The contact glass 51 is provided on the upper surface of the image reading portion 1. The contact glass 51 is a transparent document table on which a document sheet P is placed as an image reading target of the multifunction peripheral 10. The image reading portion 1 reads image data from the document sheet P placed on the contact glass 51, by being controlled by the control portion 5.

The reading unit 52 includes an LED light source 521 and a mirror 522. The reading unit 52 can be moved in a secondary scanning direction R1 (right-left direction in FIG. 1A) by a movement mechanism (not shown) using a drive motor such as a stepping motor. When the reading unit 52 is moved in the secondary scanning direction R1 by the drive motor, scanning in the secondary scanning direction R1 is performed with light radiated onto the contact glass 51 from the LED light source 521.

The LED light source 521 includes multiple white LEDs arranged along a primary scanning direction R2 (depth direction in FIG. 1A). The LED light source 521 radiates (emits) one line of white light toward a portion of the document sheet P at a reading position 52A on the contact glass 51. It is noted that the reading position 52A moves in the secondary scanning direction R1 along with movement of the reading unit 52 in the secondary scanning direction R1.

The mirror 522 reflects, toward the mirror 53, light reflected when light is radiated from the LED light source 521 to the portion of the document sheet P at the reading position 52A. The light reflected from the mirror 522 is guided to the optical lens 55 by the mirrors 53 and 54. The optical lens 55 concentrates the light entering thereto and causes the concentrated light to enter the CCD 56.

The CCD 56 is a photoelectric conversion element that converts the received light into an electric signal (voltage) corresponding to the light amount thereof and outputs the electric signal as image data. Specifically, the CCD 56 reads image data of the document sheet P, based on the light reflected from the document sheet P when light is radiated thereto from the LED light source 521. The image data read by the CCD 56 is inputted to the control portion 5.

The ADF 2 includes a document sheet set portion 21, a plurality of conveying rollers 22, a document sheet holding portion 23, a sheet discharge portion 24, and the like.

The ADF 2 drives each of the conveying rollers 22 by motors (not shown), thereby conveying the document sheet P set on the document sheet set portion 21 through the reading position 52A on the contact glass 51 to the sheet discharge portion 24. At this time, the image reading portion 1 reads image data from the document sheet P passing through the reading position 52A.

The document sheet holding portion 23 is provided above the reading position 52A on the contact glass 51, with an interval provided therebetween so as to allow the document sheet P to pass. The document sheet holding portion 23 has a shape elongated in the primary scanning direction R1. A white sheet is pasted on the lower surface (the surface on the contact glass 51 side) of the document sheet holding portion 23. In the multifunction peripheral 10, image data of the white sheet is read as white reference data. The white reference data is used for known shading correction or the like.

The image forming portion 3 is an image forming portion of electronic photograph type which executes image forming processing (printing processing) based on image data read by the image reading portion 1 or image data inputted from an information processing apparatus such as an external personal computer.

Specifically, the image forming portion 3 includes a photosensitive drum 31, a charging device 32, an LSU 33, a developing device 34, a toner container 34A, a transfer roller 35, an electricity removing device 36, a fixing roller 37, a pressure roller 38, and the like. It is noted that the configuration of the LSU 33 will be described later in detail.

In the image forming portion 3, an image is formed on a paper sheet supplied from the sheet feed cassette 4 by the following procedure. First, the photosensitive drum 31 is uniformly charged at a predetermined potential by the charging device 32. Next, light based on image data is radiated to the surface of the photosensitive drum 31 by the LSU 33. Thus, an electrostatic latent image is formed on the surface of the photosensitive drum 31. Then, the electrostatic latent image on the photosensitive drum 31 is developed (visualized) as a toner image by the developing device 34. It is noted that a toner (developer) is supplied from the toner container 34A to the developing device 34. Subsequently, the toner image formed on the photosensitive drum 31 is transferred onto a paper sheet by the transfer roller 35. Thereafter, the toner image transferred onto the paper sheet is melted and fixed by being heated by the fixing roller 37 when the paper sheet passes between the fixing roller 37 and the pressure roller 38 to be discharged. It is noted that the potential of the photosensitive drum 31 is removed by the electricity removing device 36.

The control portion 5 includes control devices such as a CPU, a ROM, a RAM, and an EEPROM. The control portion 5 executes a predetermined control program stored in the ROM by the CPU, thereby performing overall control for the multifunction peripheral 10. Specifically, an APC control program for causing the CPU to execute APC control processing (see FIG. 4) described later is stored in advance in the ROM. In addition, the RAM is a volatile storage portion and the EEPROM is a nonvolatile storage portion, and they are used as temporary storage memories for various processes executed by the CPU. It is noted that the control portion 5 may be composed of an electronic circuit such as an integrated circuit (ASIC or DSP), or may be a control portion provided separately from a main control portion that performs overall control for the multifunction peripheral 10.

It is noted that the APC control program may be stored in a computer-readable storage medium such as a CD, a DVD, or a semiconductor memory (flash memory), and may be installed from the storage medium into a storage portion such as a hard disk (not shown) included in the multifunction peripheral 10. The subject of the present disclosure may be understood as the APC control program or a computer-readable storage medium having stored therein the APC control program.

Figure 2:
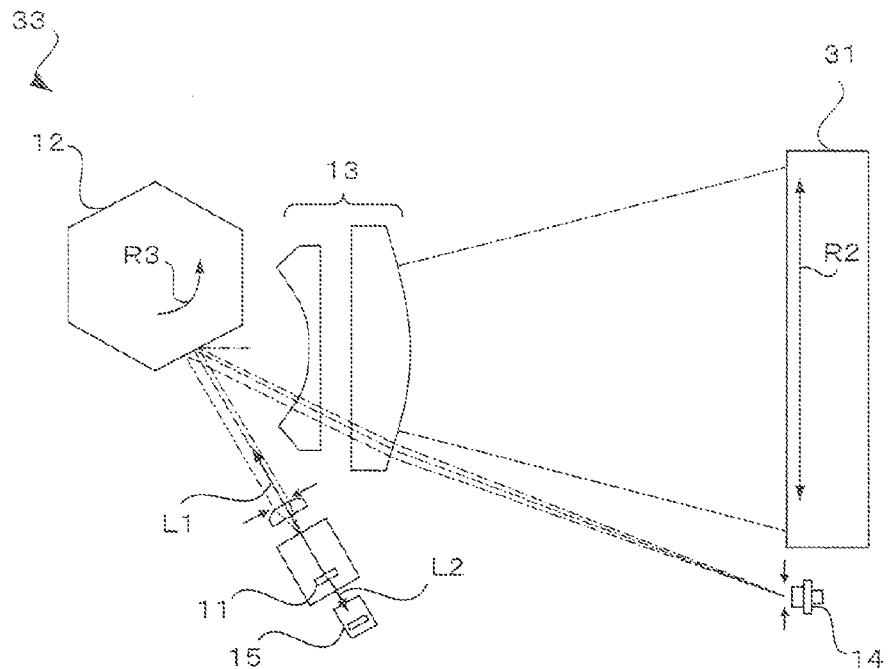
FIG. 2 is a schematic diagram showing the schematic configuration of an LSU according to the embodiment of the present disclosure.
Figure 3:
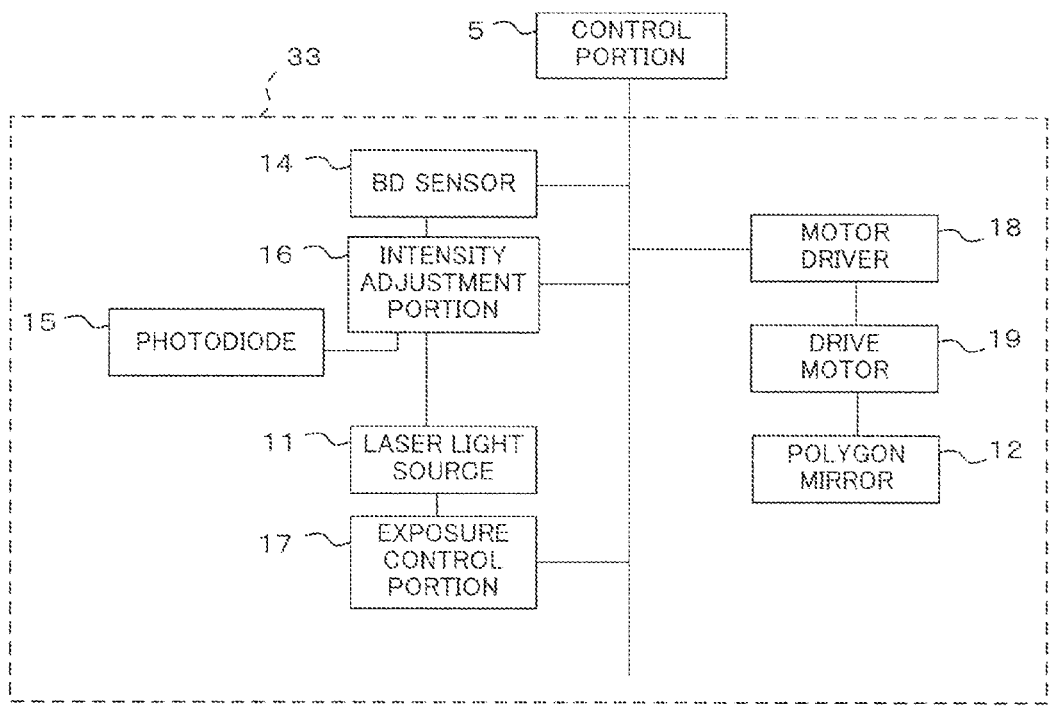
FIG. 3 is a block diagram the LSU according to the embodiment of the present disclosure.

Next, with reference to FIGS. 2 and 3, the schematic configuration of the LSU 33 will be described. Here, FIG. 2 is a schematic diagram of the LSU 33 as seen from above. FIG. 3 is a block diagram of the LSU 33.

As shown in FIG. 2, the LSU 33 includes a laser light source 11, a polygon mirror (rotating polygon mirror) 12, an fθ lens 13, a BD sensor 14 (example of entry detection portion), a photodiode 15 (example of intensity detection portion), and the like. In addition, as shown in FIG. 3, the LSU 33 includes an intensity adjustment circuit 16 (example of intensity adjustment portion), an exposure control circuit 17 (example of exposure control portion), a motor driver 18, a drive motor 19, and the like.

The laser light source 11 includes a laser diode. The laser diode includes an active layer (light emitting layer), cladding layers sandwiching the active layer, and the like. In addition, in the laser diode, since both end surfaces of the active layer serve as reflection mirrors, light reciprocates in the active layer to cause stimulated emission and light amplification. When current flowing in the cladding layers sandwiching the active layer has increased to a certain extent, laser light is radiated from both end surfaces to outside by laser oscillation. Here, a first end surface and a second end surface which are both end surfaces of the active layer are opposite to each other, and the laser light L1 radiated from the first end surface and the laser light L2 radiated from the second end surface are radiated in a first direction and a second direction which are opposite to each other on the same straight line. That is, the laser light L1 and the laser light L2 are radiated in opposite directions on a straight line. In addition, the transmittances of the first end surface and the second end surface are determined depending on a manufacture process, and there is a proportional relationship or a predetermined intensity relationship between the laser light L1 radiated from the first end surface and the laser light L2 radiated from the second end surface. Therefore, if the intensity of the laser light L2 is measured, the intensity of the laser light L1 can be derived. On the other hand, the laser light L1 is radiated from the laser light source 11 to the polygon mirror 12.

The polygon mirror 12 is rotationally driven in a direction of an arrow R3 (see FIG. 2) by the drive motor 19, thereby reflecting the laser light L1 radiated from the laser light source 11 so as to perform scanning through a predetermined scanning path passing on the surface of the photosensitive drum 31. The scanning direction of the laser light L1 according to the polygon mirror 12 is the primary scanning direction R2 (up-down direction in FIG. 2). It is noted that although the polygon mirror 12 shown in FIG. 2 is a regular hexagon, as a matter of course, the polygon mirror 12 may be another regular polygon.

The fθ lens 13 focuses the laser light L1 reflected for scanning by the polygon mirror 12 onto the surface of the photosensitive drum 31.

The BD sensor 14 is provided at a predetermined position outside an image forming region, on the scanning path of the laser light L1 reflected by the polygon mirror 12. The BD sensor 14 is a laser detection sensor that detects entry of the laser light L1 at the predetermined position. When the BD sensor 14 has detected entry of the laser light L1, the BD sensor 14 generates a laser light detection signal (Beam Detect signal, hereinafter, referred to as a "BD signal") and outputs the BD signal to the exposure control circuit 17 and the control portion 5. The BD signal is inputted from the BD sensor 14 to the control portion 5 at a detection interval (hereinafter, referred to as a "BD detection interval T") associated with the rotation speed of the polygon mirror 12.

The photodiode 15 is provided on the second direction side of the laser light source 11, and detects the intensity (light amount) of the laser light L2 radiated from the laser light source 11, by a photoelectric conversion circuit. The intensity of the laser light L2 detected by the photodiode 15 is inputted to the intensity adjustment circuit 16.

The intensity adjustment circuit 16 executes APC processing of adjusting the intensity of the laser light L1 radiated from the laser light source 11 so as to be a stable and constant value, in accordance with the detection result of the intensity by the photodiode 15. The intensity adjustment circuit 16 starts the APC processing on the condition that the intensity adjustment circuit 16 has received an APC start signal from the control portion 5. After a predetermined waiting time T1 (corresponding to a first time) has elapsed since the control portion 5 has received the BD signal, the control portion 5 inputs the APC start signal to the intensity adjustment circuit 16.

In addition, a time needed for executing the APC processing depends on the type of a laser diode used for the laser light source 11, the RC time constant of the intensity adjustment circuit 16 that executes the APC processing, and the like. Therefore, the needed time can be specified in advance. Hereinafter, a predetermined time needed for the APC processing is referred to as an APC processing time T2 (corresponding to a second time). For example, the APC processing time T2 is in a range from 800 [μs] to 900 [μs].

Upon execution of the image forming processing by the image forming portion 3, the exposure control circuit 17 controls whether or not to emit the laser light L1 to be radiated from the laser light source 11, based on inputted image data. Thus, an electrostatic latent image corresponding to the image data is formed on the surface of the photosensitive drum 31 scanned by the laser light L1 reflected by the polygon mirror 12. Here, the exposure control circuit 17 starts writing of the electrostatic latent image onto the photosensitive drum 31 after a predetermined time has elapsed since the BD signal has been inputted from the BD sensor 14. That is, in the LSU 33, the position of the primary scanning direction R2 for the electrostatic latent image to be formed on the photosensitive drum 31 is determined by the timing of output of the BD signal from the BD sensor 14.

The motor driver 18 drives the drive motor 19 at a predetermined rotation speed by the control portion 5, thereby rotating the polygon mirror 12 at the rotation speed. Specifically, upon adjustment by the intensity adjustment circuit 16, the control portion 5 rotates the polygon mirror 12, with the rotation speed of the drive motor 19 set to a predetermined APC rotation speed (corresponding to a first rotation speed). After the APC processing is finished, when an electrostatic latent image based on the image data is to be formed on the photosensitive drum 31 by the exposure control circuit 17, the control portion 5 rotates the polygon mirror 12, with the rotation speed of the drive motor 19 set to a predetermined image forming rotation speed (corresponding to a second rotation speed).

In the LSU 33 configured as described above, there is a possibility that, during execution of the APC processing by the intensity adjustment circuit 16, the laser light L1 radiated from the laser light source 11 and then reflected by the polygon mirror 12 might exceed the laser light source 11 to enter the photodiode 15. Hereinafter, such light radiated from the laser light source 11 and then reflected by the polygon mirror 12 is referred to as return light L3. Specifically, in the case where the laser light L1 radiated from the laser light source 11 perpendicularly enters the reflection surface of the polygon mirror 12, the return light L3 enters the photodiode 15. If the return light L3 enters the photodiode 15 during execution of the APC processing, the intensity of the laser light L2 detected by the photodiode 15 changes. Therefore, the accuracy of the APC processing deteriorates.

Accordingly, the multifunction peripheral 10 executes APC control processing described later by the control portion 5. Thus, the rotation speed of the polygon mirror 12 is controlled so that the return light L3 will not enter the photodiode 15 during the APC processing. Here, the control portion 5, when executing such processing, corresponds to a drive control portion.

Figure 4:
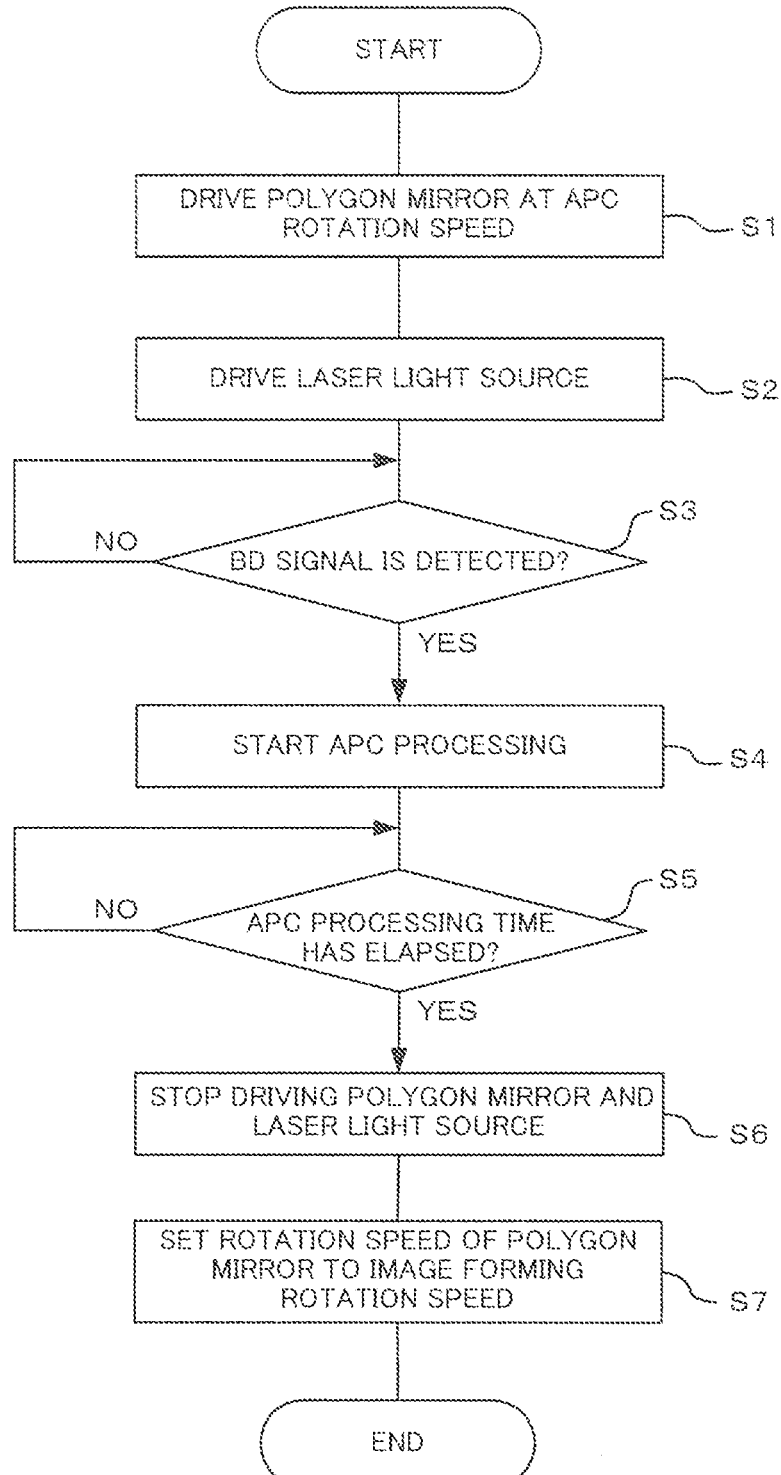
FIG. 4 is a flowchart showing an example of the procedure of APC control processing executed by the multifunction peripheral according to the embodiment of the present disclosure.

Hereinafter, with reference to a flowchart in FIG. 4, an example of a procedure of the APC processing executed by the control portion 5 will be described. It is noted that procedure (step) numbers of the processing by the control portion 5 are referred to as steps S1, S2, etc.

The APC control processing is executed by the control portion 5 at one or a plurality of timings, e.g., when the multifunction peripheral 10 is powered on or returns from a standby mode (sleep mode), when the image forming processing by the image forming portion 3 is started, every time a predetermined period elapses, or every time a predetermined number of sheets are printed. It is noted that the standby mode is an operation mode that may be also referred to as an energy saving mode or a waiting mode in general, in which the multifunction peripheral 10 is stopped except some of the functions thereof. In addition, the APC control processing may be executed by the control portion 5 at any timing in accordance with a user's operation to the operation display portion 6. Further, the APC control processing may be executed by the control portion 5 every time the set intensity of the laser light of the laser light source 11 is changed.

In the present embodiment, the case where the APC control processing is executed by the control portion 5 will be described as an example. However, the LSU 33 may include a control portion such as an MPU or an ASIC (integrated circuit) that executes the APC control processing. In this case, this control portion corresponds to a drive control portion according to the present disclosure.

First, the control portion 5 controls the motor driver 18, thereby rotating the polygon mirror 12 at the predetermined APC rotation speed (S1). Then, when the rotation speed of the polygon mirror 12 has reached the APC rotation speed, the control portion 5 drives the laser light source 11 to start radiation of the laser light L1 (S2). It is noted that in step S2, the intensity of the laser light L1 radiated from the laser light source 11 is the same as the intensity of the laser light L1 radiated from the laser light source 11 upon normal execution of the image forming processing.

Here, the APC rotation speed is a rotation speed that is slower than the image forming rotation speed and set in advance so that the return light L3 will not enter the photodiode 15 during execution of the APC processing by the intensity adjustment circuit 16. Specifically, the APC rotation speed is set in advance such that the timing when the return light L3 enters the photodiode 15 is included within a period from when the APC processing is finished to when the BD signal is generated. For example, it is conceivable that in the control portion 5, the image forming rotation speed and the APC rotation speed are stored in advance in the ROM. Then, the control portion 5 selects the image forming rotation speed when the image forming processing is executed by the image forming portion 3, and selects the APC rotation speed when the APC processing is executed by the intensity adjustment circuit 16.

Figure 5:
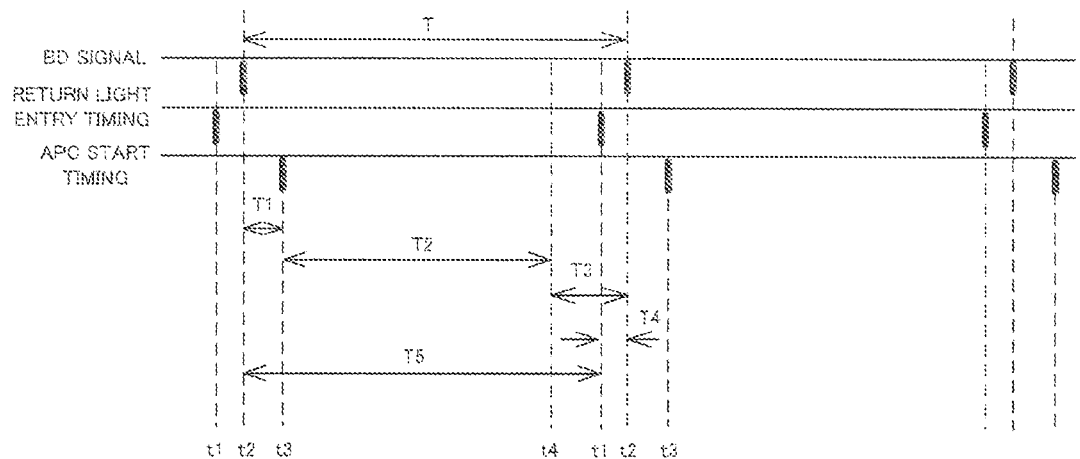
FIG. 5 is a timing chart upon execution of the APC control processing executed by the multifunction peripheral according to the embodiment of the present disclosure.

Here, FIG. 5 shows a timing chart upon execution of the APC control processing. In FIG. 5, each timing repeatedly occurs in the order of a return light entry timing t1, a generation timing t2 of the BD signal, a start timing t3 of the APC processing, an end timing t4 of the APC processing, and then the next return light entry timing t1. The return light entry timing t1 is a timing when the return light L3 enters the photodiode 15. The end timing t4 of the APC processing is a time when the APC processing time T2 has elapsed since the start timing t3 of the APC processing.

Here, as shown in FIG. 5, where T4 denotes an interval from the return light entry timing t1 to the generation timing t2 of the BD signal, and T5 denotes an interval from the generation timing t2 of the BD signal to the return light entry timing t1, it will be assumed that a relationship of T4<T5 (a relationship in which the interval T4 is shorter than the interval T5) is satisfied. In this case, the APC rotation speed may be set such that the return light entry timing t1 is included within a residual time T3 from the end timing t4 of the APC processing to the generation timing t2 of the BD signal. That is, the APC rotation speed allows the relationship of the BD detection interval T≥the waiting time T1+the APC processing time T2+the interval T4 to be satisfied. Specifically, the control portion 5 controls the motor driver 18 to drive the drive motor 19 at the APC rotation speed that allows the sum of the interval T4, the waiting time T1, and the APC processing time T2 to be equal to or smaller than the BD detection interval T.

For example, it will be assumed that the image forming rotation speed is 13000 [rpm], and when the APC processing is executed at this rotation speed, the BD detection interval T is 960 [μs], the waiting time T1 is 200 [μs], the APC processing time T2 is 800 [μs], and the interval T4 is 200 [μs]. In this case, the BD detection interval T<the waiting time T1+the APC processing time T2+the interval T4 is satisfied. Therefore, in the APC control processing, in step S1, the control portion 5 rotates the polygon mirror 12 at the APC rotation speed of 6500 [rpm] which is ½ of the image forming rotation speed. As a result, since the BD detection interval T is 1920 [μs], the waiting time T1 is 200 [μs], the APC processing time T2 is 800 [μs], and the interval T4 is 400 [μs], the relationship of the BD detection interval T≥the waiting time T1+the APC processing time T2+the interval T4 is satisfied. As a matter of course, as long as the above relationship is satisfied, the APC rotation speed may be a value greater than ½ of the image forming rotation speed or a value smaller than ½ of the image forming rotation speed, instead of a value equal to ½ of the image forming rotation speed. For example, as long as the above relationship is satisfied, the APC rotation speed may be a value such as ⅓ of the image forming rotation speed.

Thus, in the multifunction peripheral 10, only upon the APC processing, the rotation speed of the polygon mirror 12 is set at the APC rotation speed slower than the image forming rotation speed used upon execution of the image forming processing. That is, when an electrostatic latent image is to be formed on the photosensitive drum 31 by the LSU 33 in the image forming portion 3, the control portion 5 rotates the polygon mirror 12 at the image forming rotation speed faster than the APC rotation speed. Therefore, in the multifunction peripheral 10, the APC processing is executed with high accuracy and the image forming processing is executed at a high speed.

Next, the control portion 5 determines whether or not the BD signal has been inputted from the BD sensor 14 (S3). In step S3, the control portion 5 causes the process to wait until the BD signal is inputted (NO in S3). On the other hand, if the control portion 5 has determined that the BD signal has been inputted (YES in S3), the control portion 5 causes the process to proceed to step S4.

In step S4, after the waiting time T1 has elapsed, the control portion 5 causes the intensity adjustment circuit 16 to start execution of the APC processing (S4). That is, the control portion 5 maintains an interval from when the BD signal is inputted to when the APC processing is started by the intensity adjustment circuit 16, to be a constant interval (the waiting time T1). Here, in the APC processing executed by the intensity adjustment circuit 16, in the BD detection interval T, the return light entry timing t1 is included within the residual time T3 after the waiting time T1 and the APC processing time T2. Therefore, the intensity adjustment circuit 16 can execute the APC processing with high accuracy without being influenced by the return light L3.

It is noted that a configuration that the BD sensor 14 inputs the BD signal to the intensity adjustment circuit 16 is also conceivable as another embodiment. In this case, it is possible that, after receiving an APC start preparation signal from the control portion 5, the intensity adjustment circuit 16 executes the APC processing on the condition that the BD signal has been received. It is noted that in this case, the intensity adjustment circuit 16 executes the APC processing after the waiting time T1 has elapsed since the reception of the BD signal.

Thereafter, the control portion 5 determines whether or not the APC processing time T2 has elapsed since the control portion 5 has instructed the intensity adjustment circuit 16 to start execution of the APC processing (S5). That is, in step S5, the control portion 5 determines whether or not the APC processing by the intensity adjustment circuit 16 has been finished.

Here, in step S5, the control portion 5 causes the process to wait until the APC processing time T2 elapses (NO in S5). On the other hand, if the control portion 5 has determined that the APC processing time T2 has elapsed (YES in S5), the control portion 5 determines that the APC processing by the intensity adjustment circuit 16 has been finished, and causes the process to proceed to step S6.

In step S6, the control portion 5 stops driving the drive motor 19 and the laser light source 11, and thereby stopping rotation of the polygon mirror 12 and radiation of the laser light L1 from the laser light source 11 (S6).

Next, in step S7, the control portion 5 returns the rotation speed of the drive motor 19 driven by the motor driver 18 which is set in step S1, from the APC rotation speed to the image forming rotation speed (S7), and then finishes the APC control processing. As a result, in the multifunction peripheral 10, the next time the image forming portion 3 executes image forming processing, the polygon mirror 12 is rotated at the image forming rotation speed faster than the APC rotation speed. For example, a configuration that before start of the image forming processing by the image forming portion 3, the APC control processing is executed by the control portion 5, will be assumed. In this case, the control portion 5 rotates the polygon mirror 12 at the APC rotation speed when adjustment is performed by the intensity adjustment circuit 16 (S1 to S6). Thereafter, when an electrostatic latent image based on the image data is to be formed on the photosensitive drum 31 by the exposure control circuit 17, the control portion 5 rotates the polygon mirror 12 at the predetermined image forming rotation speed which is faster than the APC rotation speed (S7 and later). Thus, after adjustment has been performed by the intensity adjustment circuit 16, an electrostatic latent image based on the image data is formed on the photosensitive body by the exposure control circuit 17, whereby color unevenness of a printed image is prevented and color deviation in the color-type configuration is prevented. In addition, it is not necessary to reduce the rotation speed of the polygon mirror 12 upon forming of an electrostatic latent image onto the photosensitive drum 31. It is noted that in the case where the control portion 5 notifies the motor driver 18 of the image forming rotation speed every time execution of the image forming processing is started, step S7 can be omitted.

As described above, in the multifunction peripheral 10, the polygon mirror 12 is rotated at the predetermined APC rotation speed upon execution of the APC processing by the intensity adjustment circuit 16. Specifically, upon execution of the APC processing, the control portion 5 controls the motor driver 18 so as to drive the drive motor 19 at the APC rotation speed set in advance such that the return light entry timing t1 is included within the residual time T3 after the APC processing time T2. As a result, in the multifunction peripheral 10, the return light entry timing t1 is not included within a period (APC processing time T2) of execution of the APC processing by the intensity adjustment circuit 16. Therefore, in the APC processing, the influence of the return light L3 from the polygon mirror 12 is removed, whereby the intensity of the laser light L1 is adjusted with high accuracy.

In addition, according to the multifunction peripheral 10, it is possible to correct the intensity of the laser light L1 radiated from the laser light source 11 with high accuracy by only controlling the rotation speed of the polygon mirror 12, without providing a special device such as a light dividing device. That is, it is possible to remove the influence of the return light L3 from the polygon mirror 12 with a simple and easy configuration, without providing a light dividing device or the like such as a semi-transparent mirror. Further, since it is not necessary to provide a light dividing device or the like such as a semi-transparent mirror in the LSU 33 and the multifunction peripheral 10, such a problem that the accuracy of the APC processing is reduced because the semi-transparent mirror is tainted by dust, dirt, and the like, does not arise.

It is noted that in the present embodiment, the case where one laser light source 11 is provided for one polygon mirror 12, has been described as an example. However, the present disclosure is not limited thereto but is also applicable to a laser scanning unit having a plurality of laser light sources 11 for one polygon mirror 12. It is noted that in the case where the laser light sources 11 radiate laser light in respective different directions to the polygon mirror 12, the entry timing of the return light L3 to the photodiode 15 differs thereamong. Therefore, the APC rotation speed needs to be set to a value such that all the entry timings of the return light L3 to the photodiode 15 from the laser light sources 11 are not included within a period of execution of the APC processing.

Figure 6:
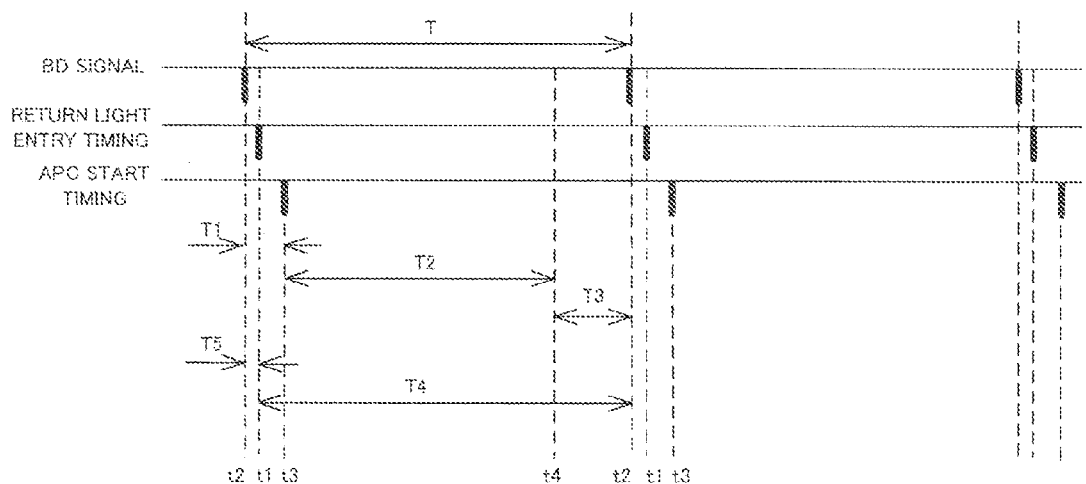
FIG. 6 is a timing chart showing another example of the APC control processing executed by the multifunction peripheral according to the embodiment of the present disclosure.

Hereinafter, with reference to FIG. 6, another embodiment of the present disclosure will be described. A different point between the other embodiment described here and the multifunction peripheral 10 according to the above embodiment is only the placement position of the BD sensor 14. Therefore, the description of the other configuration is omitted. It is noted that in FIG. 6, each timing repeatedly occurs in the order of the generation timing t2 of the BD signal, the return light entry timing t1, the start timing t3 of the APC processing, the end timing t4 of the APC processing, and then the next generation timing t2 of the BD signal.

Specifically, in the present embodiment, the BD sensor 14 is provided at a position such that a relationship in which the interval T4 from the return light entry timing t1 to the generation timing t2 of the BD signal is longer than the interval T5 from the generation timing t2 of the BD signal to the return light entry timing t1 is satisfied. More specifically, it is conceivable that the BD sensor 14 is provided on the downstream side of the photosensitive drum 31 on the scanning path of the laser light L1. In this case, first, the laser light L1 is detected by the BD sensor 14, and next, the return light L3 enters the photodiode 15. That is, a relationship of the interval T4>the interval T5 is satisfied.

On the other hand, in the example in the above embodiment shown in FIG. 2, the BD sensor 14 is provided on the upstream side of the photosensitive drum 31 on the scanning path of the laser light L1. In this case, a relationship in which the interval T4 from the return light entry timing t1 to the generation timing t2 of the BD signal is shorter than the interval T5 from the generation timing t2 of the BD signal to the return light entry timing t1, is satisfied (see FIG. 5).

In the present embodiment in which the relationship of the interval T4>the interval T5 is satisfied, the APC rotation speed is set such that the return light entry timing t1 is included within the waiting time T1. It is noted that the BD detection interval T is equal to or greater than the sum of the waiting time T1 and the APC processing time T2.

As a result, when the control portion 5 executes the APC control processing (see FIG. 4), the drive motor 19 is driven at the APC rotation speed which is set such that the return light entry timing t1 is included within the waiting time T1, during the execution of the APC processing. By this driving, the polygon mirror 12 rotates at the APC rotation speed. Therefore, it is ensured that the return light entry timing t1 occurs within the waiting time T1. Therefore, also in the present embodiment, the return light entry timing t1 is not included within a period (APC processing time T2) of execution of the APC processing by the intensity adjustment circuit 16, whereby the APC processing can be executed with high accuracy.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit comprising:
a laser light source that radiates first laser light and second laser light respectively in a first direction and a second direction which are opposite to each other;
a rotating polygon mirror that reflects the first laser light radiated from the laser light source;
a drive motor that rotates the rotating polygon mirror;
an entry detection portion that detects entry of the first laser light at a predetermined position on a scanning path of the first laser light reflected by the rotating polygon minor;
an intensity detection portion that is provided on the second direction side of the laser light source and detects an intensity of the second laser light radiated from the laser light source;
an intensity adjustment portion that adjusts the intensity of the first laser light radiated from the laser light source, in accordance with a result of the detection by the intensity detection portion, during a predetermined second time after a predetermined first time has elapsed since the detection by the entry detection portion; and
a drive control portion that, upon the adjustment by the intensity adjustment portion, drives the drive motor at a first rotation speed set in advance such that a return light entry timing when the first laser light reflected by the rotating polygon minor enters the intensity detection portion is included within either the first time or a period from when the second time has elapsed to the timing of the detection by the entry detection portion.

2. The laser scanning unit according to claim 1, wherein
an interval from the return light entry timing to the timing of the detection by the entry detection portion is shorter than an interval from the timing of the detection by the entry detection portion to the return light entry timing, and
the drive control portion drives the drive motor at the first rotation speed that allows a sum of the interval from the return light entry timing to the timing of the detection by the entry detection portion the first time and the second time to be equal to or smaller than a detection interval of the entry detection portion.

3. The laser scanning unit according to claim 1, wherein
an interval from the return light entry timing to the timing of the detection by the entry detection portion is longer than an interval from the timing of the detection by the entry detection portion to the return light entry timing, and
the drive control portion drives the drive motor at the first rotation speed that allows the return light entry timing to be included within the first time.

4. The laser scanning unit according to claim 1, further comprising:
a photosensitive body to be scanned with the first laser light reflected by the rotating polygon minor; and
an exposure control portion that controls the first laser light radiated from the laser light source based on inputted image data, wherein
the drive control portion rotates the rotating polygon mirror at a second rotation speed set in advance to be faster than the first rotation speed, when an electrostatic latent image based on the image data is to be formed on the photosensitive body by the exposure control portion.

5. The laser scanning unit according to claim 4, wherein
the drive control portion rotates the rotating polygon minor at the second rotation speed, when the electrostatic latent image based on the image data is to be formed on the photosensitive body by the exposure control portion after the drive control portion rotates the rotating polygon mirror at the first rotation speed upon the adjustment by the intensity adjustment portion.

6. An image forming apparatus comprising one or a plurality of laser scanning units, the laser scanning unit including:
a laser light source that radiates first laser light and second laser light respectively in a first direction and a second direction which are opposite to each other;
a rotating polygon mirror that reflects the first laser light radiated from the laser light source;

a drive motor that rotates the rotating polygon mirror;

an entry detection portion that detects entry of the first laser light at a predetermined position on a scanning path of the first laser light reflected by the rotating polygon minor;

an intensity detection portion that is provided on the second direction side of the laser light source and detects intensity of the second laser light radiated from the laser light source;

an intensity adjustment portion that adjusts intensity of the first laser light radiated from the laser light source, in accordance with a result of the detection by the intensity detection portion, during a predetermined second time after a predetermined first time has elapsed since the detection by the entry detection portion; and a drive control portion that, upon the adjustment by the intensity adjustment portion, drives the drive motor at a first rotation speed set in advance such that a return light entry timing when the first laser light reflected by the rotating polygon minor enters the intensity detection portion is included within either the first time or a period from when the second time has elapsed to the timing of the detection by the entry detection portion.

7. The image forming apparatus according to claim 6, wherein an interval from the return light entry timing to the timing of the detection by the entry detection portion is shorter than an interval from the timing of the detection by the entry detection portion to the return light entry timing, and the drive control portion drives the drive motor at the first rotation speed that allows a sum of the interval from the return light entry timing to the timing of the detection by the entry detection portion the first time and the second time to be equal to or smaller than a detection interval of the entry detection portion.

8. The image forming apparatus according to claim 6, wherein an interval from the return light entry timing to the timing of the detection by the entry detection portion is longer than an interval from the timing of the detection by the entry detection portion to the return light entry timing, and the drive control portion drives the drive motor at the first rotation speed that allows the return light entry timing to be included within the first time.

9. The image forming apparatus according to claim 6, further comprising:

a photosensitive body to be scanned with the first laser light reflected by the rotating polygon mirror; and an exposure control portion that controls the first laser light radiated from the laser light source based on inputted image data, wherein the drive control portion rotates the rotating polygon mirror at a second rotation speed set in advance to be faster than the first rotation speed, when an electrostatic latent image based on the image data is to be formed on the photosensitive body by the exposure control portion.

10. The image forming apparatus according to claim 9, wherein the drive control portion rotates the rotating polygon minor at the second rotation speed, when the electrostatic latent image based on the image data is to be formed on the photosensitive body by the exposure control portion after the drive control portion rotates the rotating polygon mirror at the first rotation speed upon the adjustment by the intensity adjustment portion.

* * * * *

UNITED STATES PATENT AND TRADEMARK OFFICE
CERTIFICATE OF CORRECTION

PATENT NO. : 9,041,759 B2
APPLICATION NO. : 13/967132
DATED : May 26, 2015
INVENTOR(S) : Hironobu Oi It is certified that error appears in the above-identified patent and that said Letters Patent is hereby corrected as shown below:

In the claims, column 11, line 67, delete "minor" and insert --mirror-- and;

column 12, line 15, delete "minor" and insert --mirror-- and;

column 12, line 43, delete "minor" and insert --mirror-- and;

column 12, line 53, delete "minor" and insert --mirror-- and;

column 13, line 5, delete "minor" and insert --mirror-- and;

column 13, line 20, delete "minor" and insert --mirror-- and;

column 14, line 28, delete "minor" and insert --mirror--.

Signed and Sealed this
Eighth Day of December, 2015

Michelle K. Lee
*Director of the United States Patent and Trademark Office*